United States Patent
Pfefferkorn et al.

(10) Patent No.: US 12,045,763 B2
(45) Date of Patent: Jul. 23, 2024

(54) METHOD AND SYSTEM FOR TRACKING A LOAD

(71) Applicant: ZF CV Systems Hannover GmbH, Hannover (DE)

(72) Inventors: Daniel Pfefferkorn, Hannover (DE); Thomas Wolf, Barsinghausen (DE); Thomas Hollwedel, Duesseldorf (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 241 days.

(21) Appl. No.: 17/611,586

(22) PCT Filed: May 12, 2020

(86) PCT No.: PCT/EP2020/063121
§ 371 (c)(1),
(2) Date: Nov. 16, 2021

(87) PCT Pub. No.: WO2020/234033
PCT Pub. Date: Nov. 26, 2020

(65) Prior Publication Data
US 2022/0245578 A1    Aug. 4, 2022

(30) Foreign Application Priority Data
May 20, 2019 (DE) ...................... 10 2019 113 227.4

(51) Int. Cl.
*G06Q 10/0833* (2023.01)
*H04W 4/029* (2018.01)
(Continued)

(52) U.S. Cl.
CPC ........ *G06Q 10/0833* (2013.01); *H04W 4/029* (2018.02); *H04W 4/35* (2018.02); *H04W 4/80* (2018.02)

(58) Field of Classification Search
CPC .... G06Q 10/0833; H04W 4/029; H04W 4/35; H04W 4/80
See application file for complete search history.

(56) References Cited

U.S. PATENT DOCUMENTS

| | | | |
|---|---|---|---|
| 2002/0089434 A1* | 7/2002 | Ghazarian | G08B 13/06 340/988 |
| 2007/0030169 A1 | 2/2007 | McNay | |

(Continued)

FOREIGN PATENT DOCUMENTS

| | | |
|---|---|---|
| CN | 104408604 A | 3/2015 |
| CN | 108197790 A | 6/2018 |

(Continued)

OTHER PUBLICATIONS

Ashok Pundir, Improving Supply Chain Visibility Using IoT—Internet of Things, 2019, p. 156-158 (Year: 2019).*

*Primary Examiner* — Ibrahim N El-Bathy
(74) *Attorney, Agent, or Firm* — LEYDIG, VOIT & MAYER, LTD.

(57) ABSTRACT

A method is provided for tracking a load when loading a vehicle. The load is provided with a load communication module and the vehicle includes, at an entrance, at least two entrance communication modules and, at a distance from the entrance and from the entrance communication modules, at least one vehicle communication module. The method includes, when the load is delivered to the vehicle, first communicating, by the load communication module with the at least two entrance communication modules and then communicating, by the load communication module with the vehicle communication module.

18 Claims, 5 Drawing Sheets

(51) Int. Cl.
*H04W 4/35* (2018.01)
*H04W 4/80* (2018.01)

(56) References Cited

U.S. PATENT DOCUMENTS

| | | |
|---|---|---|
| 2009/0015400 A1 | 1/2009 | Breed |
| 2009/0160646 A1 | 6/2009 | Mackenzie et al. |
| 2016/0148440 A1 | 5/2016 | Kwak |
| 2017/0279892 A1* | 9/2017 | Skaaksrud .......... H04W 52/322 |

FOREIGN PATENT DOCUMENTS

| | | | |
|---|---|---|---|
| CN | 108875859 A | 11/2018 | |
| DE | 19504733 A1 | 8/1996 | |
| EP | 1544830 A1 | 6/2005 | |
| WO | WO-2011038018 A1 * | 3/2011 | ............. G06Q 10/00 |

* cited by examiner

METHOD AND SYSTEM FOR TRACKING A LOAD

CROSS REFERENCE TO RELATED APPLICATIONS

This application is a U.S. National Phase application under 35 U.S.C. § 371 of International Application No. PCT/EP2020/063121, filed on May 12, 2020, and claims benefit to German Patent Application No. DE 10 2019 113 227.4, filed on May 20, 2019. The International Application was published in German on Nov. 26, 2020 as WO 2020/234033 A1 under PCT Article 21(2).

FIELD

The present disclosure relates to a method for tracking a load when loading a vehicle. In addition, the present disclosure relates to a system for tracking a load, to a control unit, and to a vehicle.

BACKGROUND

Typically, a vehicle has a cargo space for receiving the loads, said cargo space being completely or partly enclosed. As an extreme case, the cargo space is not enclosed and only in the form of a loading surface. Even then, however, loads can be stacked three-dimensionally beside one another and above one another and secured, and so here too a loading surface is regarded as a loading space.

When loads are transported on a vehicle, the customer wants to know whether and from when the load is in the cargo space.

Detection of goods when they enter the cargo space is known from US 2002/0089434 A1. There is provision for an RFID reader on the inside of the cargo space at a rear entrance door. Goods equipped with an RFID transponder are registered as they pass by the RFID reader. In the driver's cab, there is provision for a further RFID reader that is used to register movements of the driver.

US 2016/0148440 A1 discloses the practice of arranging an RFID reader in the cargo space of a vehicle, centrally at the top, and of detecting so-called RFID tags on goods.

One particular problem is detecting loads when loading a vehicle if multiple vehicles are standing close to one another, for example trucks at a depot or in a logistics center. Some of the goods are delivered past the entrances of the vehicles to a destination vehicle. This in itself can result in on-vehicle readers detecting and registering the loads even though the relevant vehicle is not being loaded. Additionally, when loading the destination vehicle, readers of adjacent vehicles can likewise register the load.

SUMMARY

In an embodiment, the present disclosure provides a method for tracking a load when loading a vehicle. The load is provided with a load communication module and the vehicle includes, at an entrance, at least two entrance communication modules and, at a distance from the entrance and from the entrance communication modules, at least one vehicle communication module. The method includes, when the load is delivered to the vehicle, first communicating, by the load communication module with the at least two entrance communication modules and then communicating, by the load communication module with the vehicle communication module.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides a method/system that can be used to safely track the load when loading a vehicle. A load can be understood to mean anything that can be loaded into a vehicle and provided with a transmitter or receiver, in particular packaged goods, for example machines, containers or concrete, steel, wooden or plastic parts.

The present disclosure provides a method. In particular, there is provision that the load is provided with a load communication module, there is provision for at least two entrance communication modules at an entrance to the vehicle, there is provision for at least one vehicle communication module in the vehicle at a distance from the entrance and from the entrance communication modules, wherein the load is delivered to the vehicle and first the load communication module communicates with the entrance communication modules and then the load communication module communicates with the vehicle communication module.

The communication of the load communication module with multiple communication modules on the vehicle allows better identification and association with the relevant vehicle. This allows incorrect associations with vehicles to be avoided to an even better degree. The communication takes place wirelessly, in particular by radio.

According to a further concept of the present disclosure, there is provision that when communicating with the entrance communication modules, the load communication module first transmits at low signal strength and, after receiving an activation message, transmits at higher signal strength. This allows the energy consumption on the part of the load communication module to be reduced.

According to a further concept of the present disclosure, there is provision that the load communication module first transmits a load identifier, the entrance communication modules receive the load identifier and convey said load identifier together with a timestamp and an RSSI to a controller, the controller verifies the received data and stores the load identifier if the load identifier has not been stored hitherto, following clearance by the controller, at least one of the entrance communication modules transmits an activation message to the load communication module, after receiving the activation message, the load communication module continues to transmit the load identifier, the vehicle communication module receives the load identifier of the load communication module and conveys the load identifier as a message to the controller.

Identifier is understood to mean a unique message for identification, for example a number combination of sufficient length. The load identifier is the identifier of the load communication module. The RSSI is an indicator of the signal strength of the received signal. The entrance communication modules each receive the identifier of the load communication module and in so doing determine what signal strength there is. The result is the RSSI. The controller verifies the identifier, timestamp and RSSI received from each entrance communication module and includes an algorithm that, in the light of the verified data, actuates at least one of the entrance communication modules to transmit the activation message. The linking of the different communication modules increases the certainty of the detection of the load further. The controller can be integrated in one of the communication modules or relocated to a separate control unit.

According to a further concept of the present disclosure, after receiving the message from the vehicle communication module, the controller can record the load communication module as being in the vehicle and convey this as a presence message to an external receiver. The presence of the load communication module can be stored in the controller or in the vehicle communication module. The external receiver is preferably a telematics portal or a fleet operator.

According to a further concept of the present disclosure, there is provision that the controller evaluates one or more of the data a) load identifier, b) timestamp for the arrival of the message from the load communication module, c) RSSI of the message from the load communication module, and determines therefrom whether at least one of the entrance communication modules is supposed to transmit the activation message. Both entrance communication modules send a load identifier, timestamp and RSSI to the controller, as a result of which the data are present in duplicate there and can be compared with one another. Preferably, all of the data are evaluated. If the load identifiers differ, an activation message is not transmitted, since the entrance communication modules have then received signals from different load communication modules. The timestamps are not supposed to differ all too greatly. If they do, the load has not entered the cargo space between the entrance communication modules. A limit value for a maximum timestamp difference is therefore stored in the controller. The same applies to a difference for the RSSIs. Additionally or alternatively, the absolute value of the RSSIs can be verified. If an RSSI is too low, the load has passed by the entrance communication modules at too great a distance and has possibly merely entered an adjacent vehicle.

According to a further concept of the present disclosure, there can be provision that at least one of the entrance communication modules transmits the activation message to the load communication module if at least one of the following conditions is met: a) the load identifiers received by the two entrance communication modules match, b) the timestamps conveyed by the entrance communication modules have a difference below a limit value, c) the RSSIs conveyed by the entrance communication modules are above a limit value, d) the RSSIs conveyed by the entrance communication modules have a difference below a limit value.

According to a further concept of the present disclosure, one or more of the communication modules can transmit and receive Bluetooth beacon messages. Typical Bluetooth beacon messages are identifiers of Bluetooth transmitters that transmit regularly and at short intervals. The transmitters are referred to as Bluetooth beacons. This technology allows an energy-saving radio connection, and also detection of the RSSI.

According to a further concept of the present disclosure, there can be provision that the entrance communication modules first transmit their identifiers and a vehicle identifier, the load communication module receives the identifiers and detects RSSIs, the load communication module verifies whether a) the identifiers of the entrance communication modules are different, b) the vehicle identifiers are identical, c) a difference between the RSSIs is less than a limit value.

According to a further concept of the present disclosure, there can be provision that if conditions a), b) and c) above are met then the load communication module changes from a non-transmission mode to a transmission mode or from a transmission mode with lower signal strength to a transmission mode with higher signal strength. In addition, the load communication module is in the reception mode.

According to a further concept of the present disclosure, there can be provision that the load communication module transmits its load identifier and the vehicle identifiers if conditions a), b) and c) above are met.

According to a further concept of the present disclosure, there can be provision that the vehicle communication module receives the vehicle identifiers transmitted by the load communication module and conveys said vehicle identifiers to a controller, and the controller compares the received vehicle identifiers with its own vehicle identifier. Since a vehicle contains one vehicle communication module and two entrance communication modules, there is a unique association with the vehicle. Accordingly, these modules can have the same vehicle identifier, in addition to the respective module identifier. A comparison of the received vehicle identifiers with their own vehicle identifiers allows the received signals to be associated with their own entrance communication modules or with external communication modules.

According to a further concept of the present disclosure, there can be provision that the controller stores the load communication module as being in the vehicle if the vehicle identifier of the vehicle communication module/the controller matches the vehicle identifier transmitted by the load communication module, and the controller conveys this as a presence message to an external receiver.

According to a further concept of the present disclosure, there can be provision that the load communication module transmits its load identifier, the vehicle communication module and the entrance communication modules receive the load identifier and convey said load identifier together with timestamp or RSSI or timestamp and RSSI to a controller, and the controller calculates a position of the load communication module in the vehicle from these data.

The present disclosure further provides a system for tracking a load when loading a vehicle. In particular, there is provision for at least two entrance communication modules that are to be positioned at an entrance to the vehicle, at least one vehicle communication module that is to be positioned in the vehicle and at a distance from the entrance and from the entrance communication modules, at least one load communication module that is to be positioned on the load, wherein, when the load is delivered to the vehicle, first the load communication module communicates with the entrance communication modules and then the load communication module communicates with the vehicle communication module.

The system includes the different communication modules and the capability thereof to communicate under specific conditions.

According to a further concept of the present disclosure, there can be provision for a control unit that is connected to the entrance communication modules and to the vehicle communication module and controls the communication with the load communication module. The control unit can also be integrated in the vehicle communication module or in one of the entrance communication modules.

According to a further concept of the present disclosure, there can be provision for a telematics device that is connected to the control unit or to at least one of the communication modules. The telematics device can be used to transmit information and messages to an external receiver. Preferably, the telematics device includes a mobile radio device.

According to a further concept of the present disclosure, all of the communication modules can be transmitters and receivers. For reasons of cost, individual communication modules can also be just receivers or just transmitters, however.

According to a further concept of the present disclosure, there can be provision that the load communication module is a transmitter and a receiver, the entrance communication modules are just transmitters, the vehicle communication module is a transmitter and a receiver or just a receiver.

According to a further concept of the present disclosure, one or more of the communication modules can contain a Bluetooth beacon. The Bluetooth beacon regularly transmits its identifier and possibly further information at short intervals of time.

The present disclosure further provides a control unit for a system as described above, having connections for one or more communication modules and having software for controlling the connected communication modules.

The present disclosure further provides a vehicle having a system as described above.

According to a further concept of the present disclosure, the vehicle can have entrance communication modules arranged on either side of an entrance to a cargo space.

According to a further concept of the present disclosure, there can be a vehicle communication module arranged in the cargo space, at a distance from entrance communication modules.

According to a further concept of the present disclosure, a vehicle communication module can be arranged on a front wall of the cargo space.

Further features of the present disclosure are explained in more detail below with reference to drawings.

Figure 1:
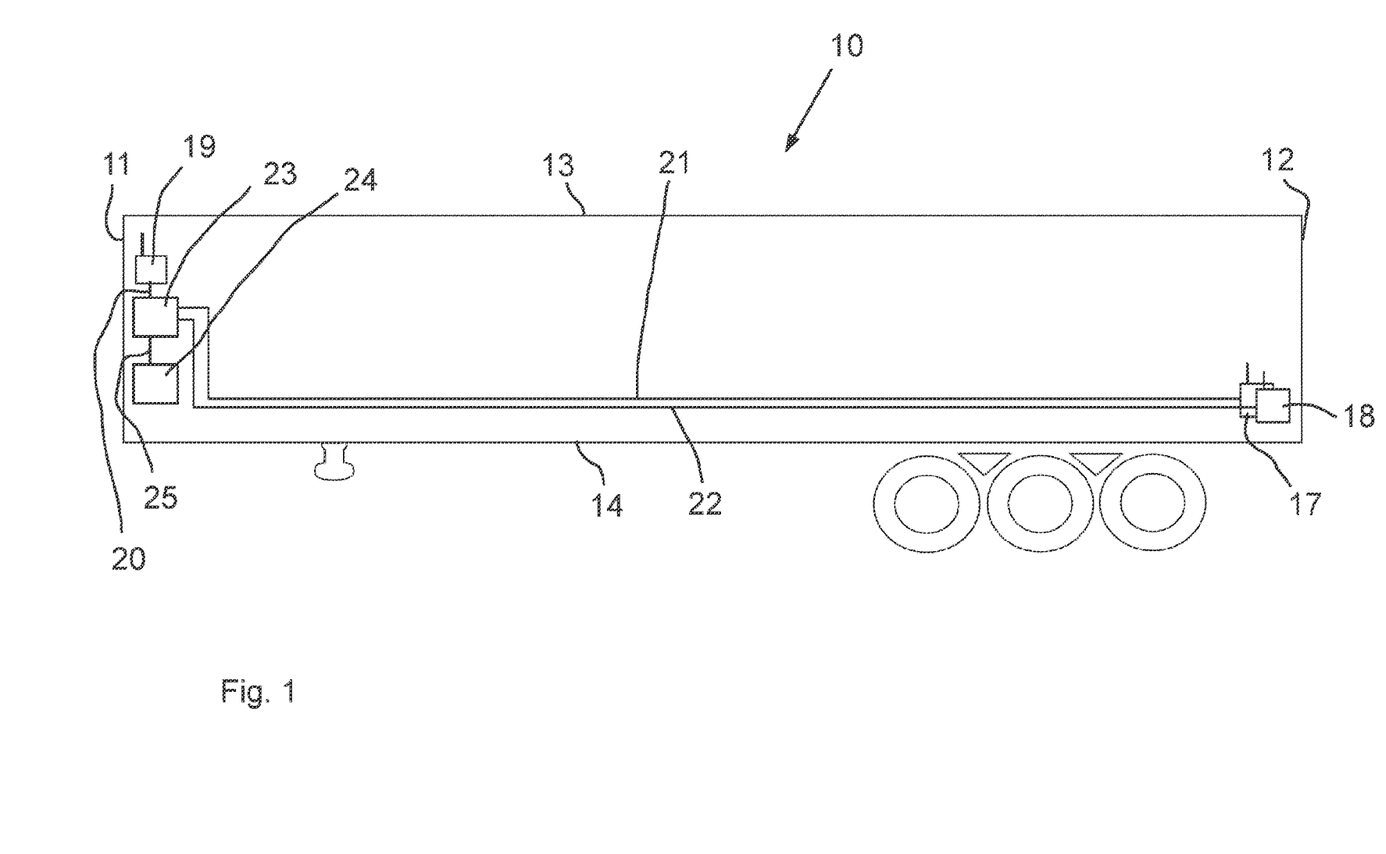
FIG. 1 shows a schematic depiction of a system for tracking a load when loading a towed vehicle, here in a side view.
Figure 2:
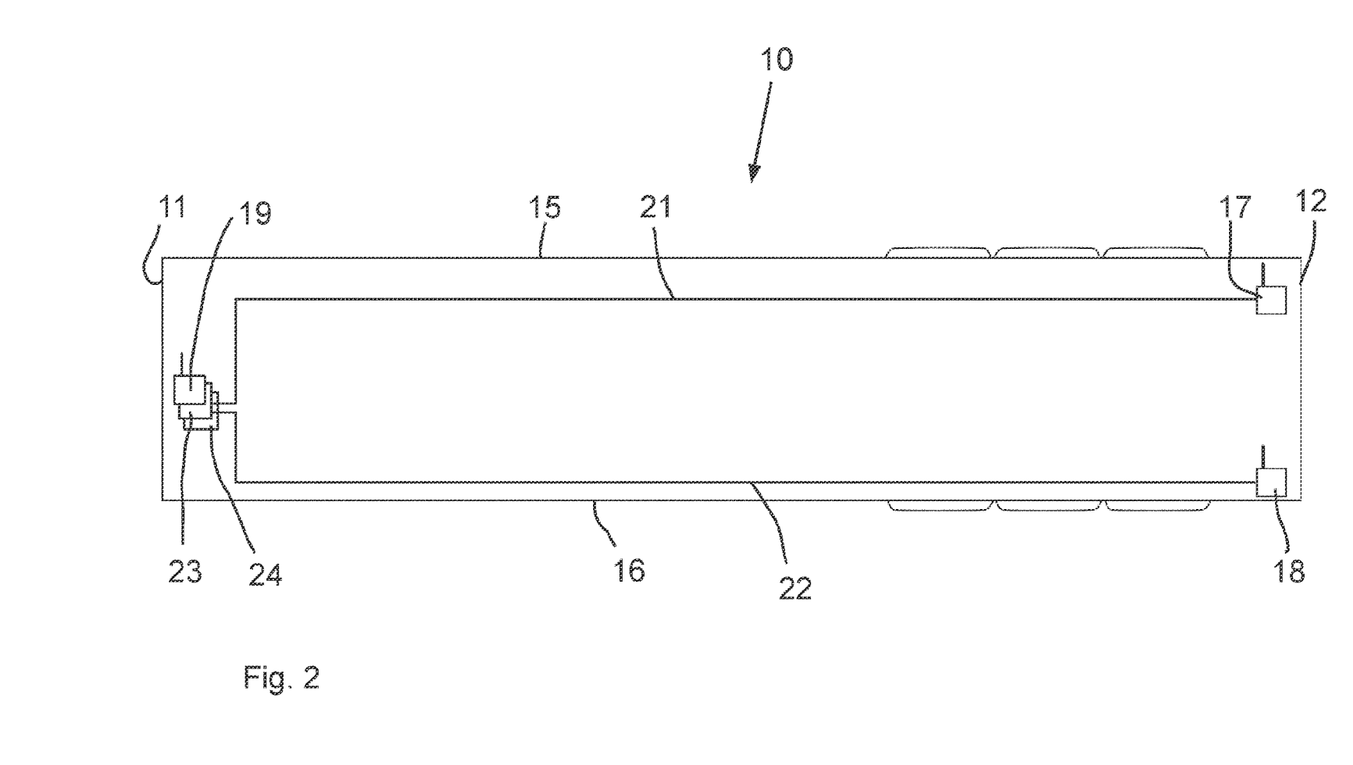
FIG. 2 shows the system shown in FIG. 1 in a schematic plan view from above.
Figure 3:
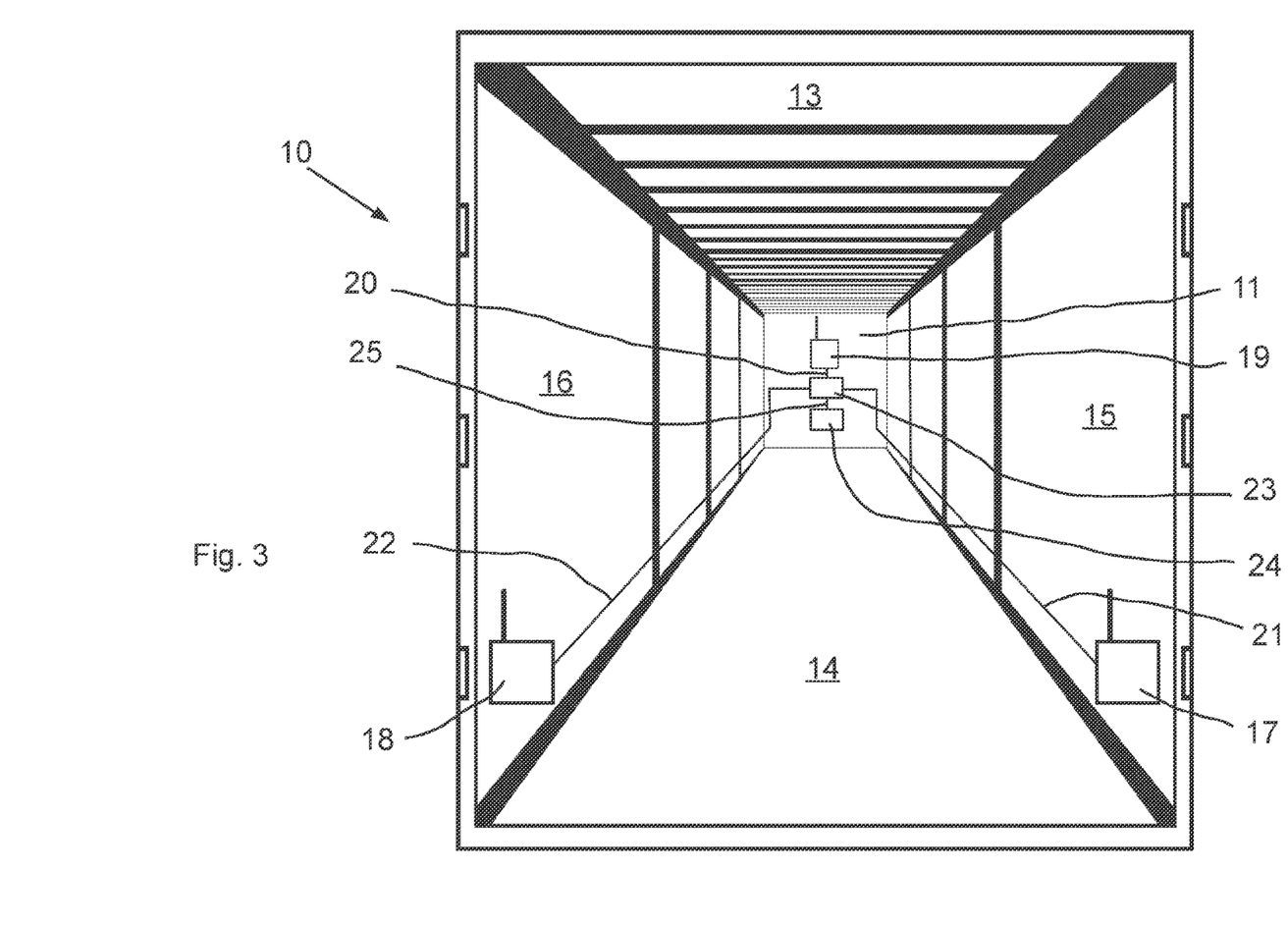
FIG. 3 shows the system shown in FIG. 1 in a perspective rear view, with the rear end wall open.

A towed vehicle 10 here is in the form of a closed trailer, having a front wall 11, rear wall 12, top wall 13, bottom wall 14 and elongate side walls 15, 16. In the region of the rear wall 12, the towed vehicle 10 is provided with doors, not shown, to form an opening, through which loads are deliverable or transportable to the interior of the towed vehicle.

Arranged in the interior of the towed vehicle 10, close to the rear wall 12 and close to the bottom wall 14, are two entrance communication modules 17, 18, namely one on each side wall 15, 16. A vehicle communication module 19 is arranged in the interior of the towed vehicle 10 close to the front wall 11, close to the top wall 13 and somewhat centrally between the side walls 15, 16.

The communication modules 17, 18, 19 are connected to a control unit 23 via lines 20, 21, 22. A telematics device 24 for communicating with an external receiver, not shown, is likewise connected to the control unit 23 via a line 25.

The communication modules 17, 18, 19 are preferably transmitters and receivers and, as so-called Bluetooth beacons, transmit at least their individual identifiers. Accordingly, the communication modules 17, 18, 19 can receive and evaluate beacon messages. Depending on the application and the method, individual communication modules can also be just transmitters or receivers.

The control unit 23 receives information about the received data from the communication modules 17, 18, 19, itself provides data and controls transmission processes of the communication modules 17, 18, 19. In particular, the control unit 23 stores a vehicle identifier that, depending on the method and the application, is also made available to the communication modules 17, 18. The functionality of the control unit 23 can also be integrated in one of the communication modules 17, 18, 19, in particular in the vehicle communication module 19.

When the towed vehicle 10 is being loaded, the communication modules 17, 18, 19 communicate wirelessly with the load communication modules 26, not shown in FIGS. 1 to 3, which are each connected to a load 27. The load 27 is for example a closed container having a volume of 0.5 m³.

A first exemplary embodiment of a method is explained below with reference to FIG. 4 (method A). To improve clarity, lines 20, 21, 22, 25, control unit 23 and telematics device 24 are not shown.

Figure 4:
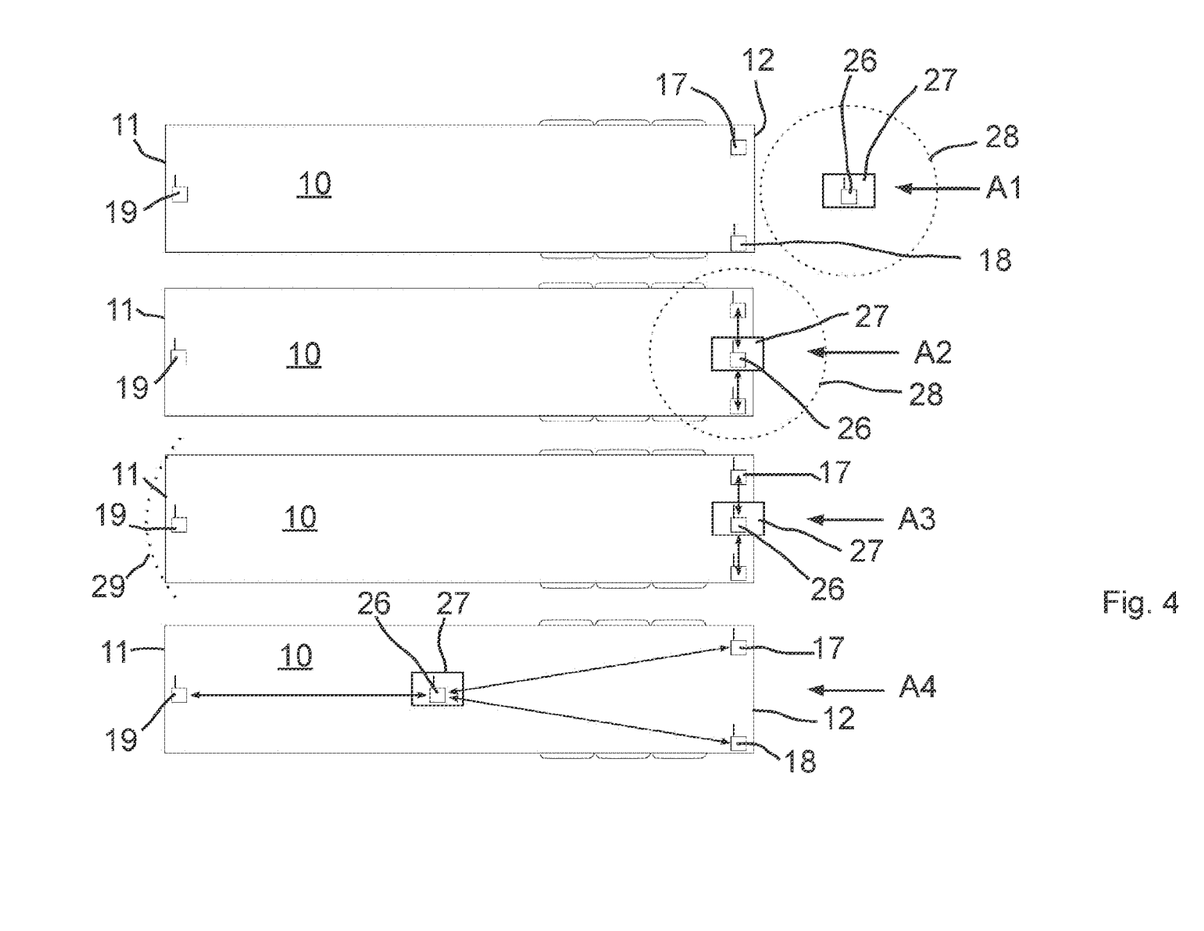
FIG. 4 shows a schematic depiction of the sequence of steps in a first exemplary embodiment (A)

The load communication module 26 on the load 27 transmits at reduced or minimal signal strength and is located, at a distance, in front of the rear wall 12 of the towed vehicle 10 and outside said towed vehicle, see phase A1 in FIG. 4. The range of the load communication module 26 is indicated by a signal circle 28 and so short that the entrance communication modules 17, 18 do not yet receive a signal.

The load 27 is delivered to the towed vehicle 10 and, in the process, passes between the two entrance communication modules 17, 18, see phase A2. As a result, the entrance communication modules 17, 18 receive the signal from the load communication module 16, namely a load identifier, at a specific received signal strength. Both entrance communication modules 17, 18 register the load identifier, a value RSSI for the received signal strength and a time of day as timestamp for the respective arrival of the signal. These registered data are conveyed to the control unit 23 and processed there.

The control unit 23 stores load identifiers that are already known, that is to say present as a charge. The load identifiers received from the two entrance communication modules 17, 18 in phase A2 are compared in the control unit 23 with the charge identifiers that are already present. If the two load identifiers received in phase A2 match and at the same time are different than charge identifiers that are already present, the control unit 23 activates at least one of the entrance communication modules 17, 18 such that an activation message is transmitted to the load communication module 26.

After receiving the messages of the entrance communication modules 17, 18, the control unit 23 preferably also verifies the two RSSIs and compares them with one another. If the RSSIs are below a limit value and/or the difference between the two RSSIs exceeds a limit value, it is assumed that the load 27 has not entered the towed vehicle 10. An activation message is then not transmitted to the load communication module 26.

Finally, the timestamps of the messages received from the entrance communication modules 17, 18 can also be compared. If a time difference is too great, an activation message is likewise not transmitted to the load communication module 26.

In accordance with phase A3, the activation message prompts the load communication module 26 to switch to a higher signal strength, for example a standard signal strength, represented by a signal segment 29 that reaches as far as the vehicle communication module 19. The load communication module 26 continues to transmit its load identifier in this case. There is now a radio connection between the three communication modules 17, 18, 19 and the load communication module 26, see phase A4. At the same time, the load 27 has continued to be delivered to the interior of the towed vehicle 10.

The vehicle communication module 19 has conveyed the load identifier received by radio to the control unit 23. There, at least two new load identifiers are now present, namely the load identifier received and conveyed from the entrance communication modules 17, 18 and the load identifier received and conveyed from the vehicle communication module 19. The control unit 23 compares the load identifiers. If they match, it is assumed that the relevant load 27 is now in the interior of the towed vehicle 10. The information about the load 27 can be conveyed via the telematics device 24 to an external receiver, for example to a fleet operator or an Internet portal.

The load communication module 26 continues to transmit the load identifier, which means that it continues to be possible to check that the load 27 is in the towed vehicle 10. Additionally or alternatively, the load communication module 26 can send information from connected sensors, for example temperature, acceleration, moisture, etc.

Figure 5:
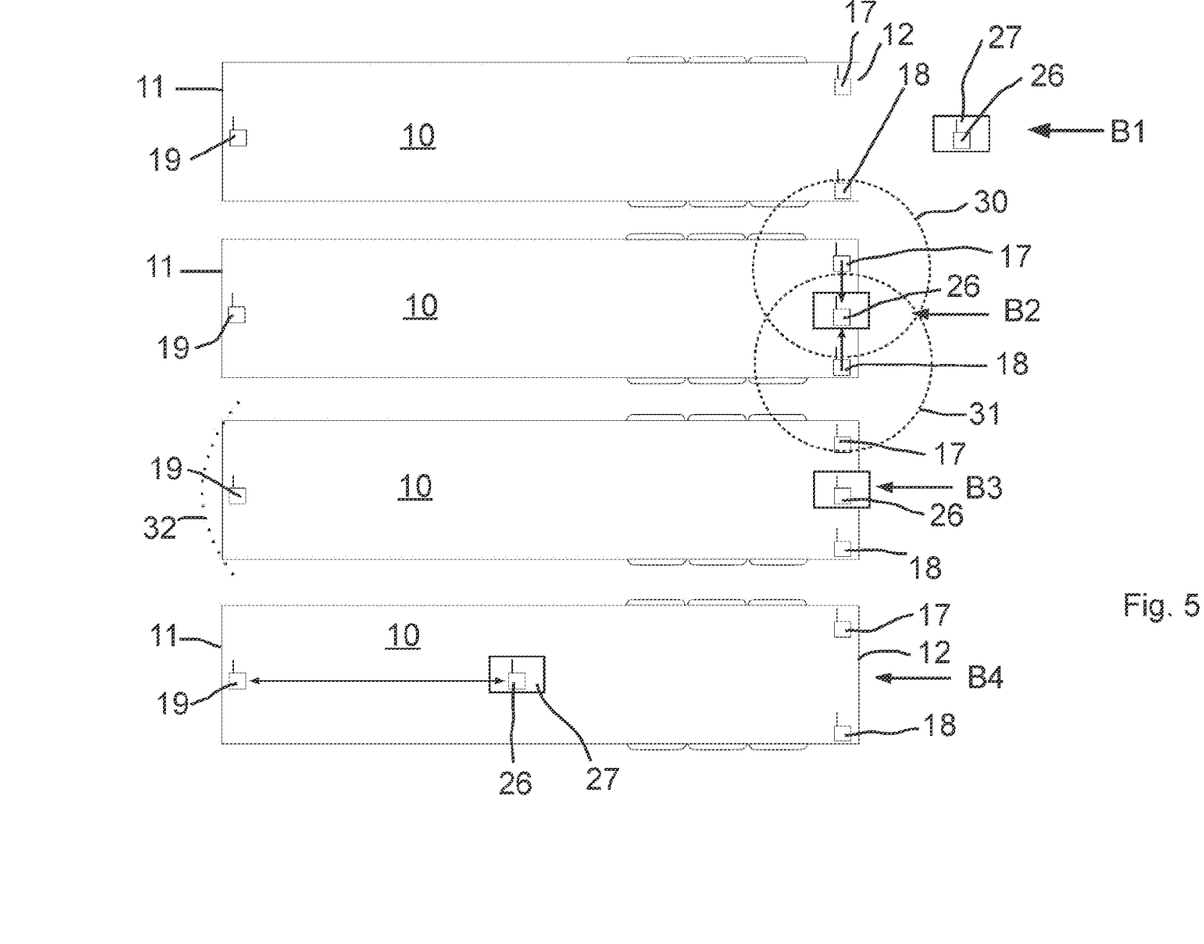
FIG. 5 shows a sequence of steps in a second exemplary embodiment (B).

A second exemplary embodiment of a method (embodiment B) is explained with reference to FIG. 5. Phases B1, B2, B3 and B4 can be seen. In phase B1, the load 27 with the load communication module 26 is located outside the towed vehicle 10. The load communication module 26 is either inactive or transmits a load identifier at reduced signal strength.

As depicted by way of signal circles 30, 31 in phase B2 only, the entrance communication modules 17, 18 transmit at sufficient signal strength for the load communication module 26 to be able to receive data on entering the towed vehicle 10. The transmitted data are in particular the vehicle identifier and module identifiers of the entrance communication modules 17, 18. Preferably, the entrance communication modules 17, 18 also transmit their data during the other phases B1, B3, B4.

The load communication module 26 receives the data and checks them, in particular in conjunction with RSSI and timestamp. If identical vehicle identifiers are available from two different entrance communication modules and the difference between the RSSIs does not exceed a limit value and timestamps for the arrivals of the data differ only slightly (below a limit value), the load communication module 26 assumes that the opening of the towed vehicle 10 has been reached or has been passed. The load communication module 26 then switches to a higher signal strength, which is of such proportions that the vehicle communication module 19 is reached, see phase B3 with signal segment 32. The load communication module 26 transmits the vehicle identifier received from the entrance communication modules 17, 18 (or at least from one) together with the load identifier.

The vehicle communication module 19 compares the received vehicle identifier with its own. In the event of a match, the load identifier is registered and the load 27 is stored as being in the vehicle. This information can be conveyed to an external receiver via the telematics device 24.

The load communication module 26 continues to transmit its data and/or is in radio contact with the vehicle communication module 19, see phase B4. In this way it is possible to determine whether or when the load communication module 26 moves away from the vehicle communication module 19 again, for example when the load 27 is unloaded. Surroundings parameters such as temperature, acceleration, moisture etc. can also be conveyed to the vehicle communication module 19, and made available to external receivers, in conjunction with suitable sensors on the load communication module 26.

Further communication of the load communication module 26 with the entrance communication modules 17, 18 and the vehicle communication module 19 also allows location determination inside the towed vehicle 10, for example by comparing RSSIs and/or timestamps, likewise see phase B4.

In this second exemplary embodiment (method B), the entrance communication modules 17, 18 are preferably just transmitters. The vehicle communication module 19 is in particular just a receiver.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 10 towed vehicle
11 front wall
12 rear wall
13 top wall
14 bottom wall
15 side wall
16 side wall
17 entrance communication module
18 entrance communication module
19 vehicle communication module
20 line 21 line
22 line
23 control unit
24 telematics device
25 line
26 load communication module
27 load
28 signal circle
29 signal segment
30 signal circle
31 signal circle
32 signal segment

The invention claimed is:

1. A method for tracking a load when loading a vehicle, the load being provided with a load communication module, the vehicle including, at an entrance, at least two entrance communication modules and, at a distance from the entrance and from the entrance communication modules, at least one vehicle communication module, the method comprising:
receiving the load at the vehicle;
first communicating, by the load communication module with the at least two entrance communication modules and then communicating, by the load communication module with the vehicle communication module,
wherein:
the entrance communication modules first transmit their identifiers and a vehicle identifier,
the load communication module receives the identifiers and detects RSSIs,
the load communication module verifies whether:
a) the identifiers of the entrance communication modules are different,
b) the vehicle identifiers are identical, and
c) a difference between the RSSIs is less than a limit value,
the load communication module transmits its load identifier and the vehicle identifiers in response to conditions a), b) and c) being met, and
the vehicle communication module receives the vehicle identifiers transmitted by the load communication module and conveys the vehicle identifiers to a controller, and the controller compares the received vehicle identifiers with a reference vehicle identifier.

2. The method as claimed in claim 1, wherein, when communicating with the entrance communication modules, the load communication module first transmits at low signal strength and, after receiving an activation message, transmits at higher signal strength.

3. The method as claimed in claim 1, wherein the method includes:
first transmitting, by the load communication module, a load identifier,
receiving, by the entrance communication modules, the load identifier and conveying the load identifier together with a timestamp and a received signal strength indicator (RSSI) to a controller,
verifying, by the controller, the received data and storing the load identifier if the load identifier has not been previously stored,
transmitting, by at least one of the entrance communication modules following clearance by the controller, an activation message to the load communication module,
continuing to transmit, by the load communication module after receiving the activation message, it's the load identifier,
receiving, by the vehicle communication module, the load identifier and conveying the load identifier as a message to the controller.

4. The method as claimed in claim 3, wherein, after receiving the message from the vehicle communication module, the controller records the load communication module as being in the vehicle and conveys this as a presence message to an external receiver.

5. The method as claimed in claim 3, wherein the controller evaluates one or more of the data load identifier, the timestamp for the arrival of the message from the load communication module, and the RSSI of the message from the load communication module, and the controller determines therefrom whether at least one of the entrance communication modules is supposed to transmit the activation message.

6. The method as claimed in claim 5, wherein at least one of the entrance communication modules transmits the activation message to the load communication module in response to at least one of the following conditions being met:
d) the load identifiers received by the two entrance communication modules match,
e) the timestamps conveyed by the entrance communication modules have a difference below a limit value,
f) the RSSIs conveyed by the entrance communication modules are above a limit value,
g) the RSSIs conveyed by the entrance communication modules have a difference below a limit value.

7. The method as claimed in claim 1, wherein one or more of the communication modules transmit and receive Bluetooth beacon messages.

8. The method as claimed in claim 1, wherein the load communication module changes, in response to conditions a), b) and c) not being met, then the load communication module changes from a non-transmission mode to a transmission mode or from a transmission mode with lower signal strength to a transmission mode with higher signal strength.

9. The method as claimed in claim 1, wherein the controller stores the load communication module as being in the vehicle in response to the vehicle identifier of the vehicle communication module and/or of the controller matching the vehicle identifier transmitted by the load communication module, and the controller conveys this as a presence message to an external receiver.

10. The method as claimed in claim 1, wherein the load communication module transmits the load identifier, wherein the vehicle communication module and the entrance communication modules receive the load identifier and convey the load identifier, together with a timestamp and/or a received signal strength indicator (RSSI) to a controller, and wherein the controller calculates a position of the load communication module in the vehicle based on the timestamp and/or the received RSSI.

11. A system for tracking a load when loading a vehicle, the system comprising:
at least two entrance communication modules configured to be positioned at an entrance to the vehicle,
at least one vehicle communication module configured to be positioned in the vehicle and at a distance from the entrance of the vehicle and from the entrance communication modules,
at least one load communication module configured to be positioned on the load,
wherein, when the load is delivered to the vehicle, the load communication module is configured to first communicate with the entrance communication modules and the load communication module is configured to subsequently communicate with the vehicle communication module, and a controller connected to the at least two entrance communication modules and to the at least one vehicle communication module and configured to control the communication with the load communication module, wherein:

the entrance communication modules are configured to first transmit their identifiers and a vehicle identifier, the load communication module is configured to receive the identifiers and detect RSSIs, the load communication module is configured to verify whether:
 a) the identifiers of the entrance communication modules are different,
 b) the vehicle identifiers are identical, and
 c) a difference between the RSSIs is less than a limit value, the load communication module is configured to transmit its load identifier and the vehicle identifiers in response to conditions a), b) and c) being met, and the vehicle communication module is configured to receive the vehicle identifiers transmitted by the load communication module and convey the vehicle identifiers to the controller, and the controller is configured to compare the received vehicle identifiers with a reference vehicle identifier.

12. The system as claimed in claim 11, further comprising a telematics device connected to the controller or to at least one of the communication modules.

13. The system as claimed in claim 11, wherein the at least two entrance communication modules, the at least one vehicle communication module, and the load communication module are transmitters and receivers.

14. The system as claimed in claim 11, wherein the load communication module is a transmitter and a receiver,
 wherein the at least two entrance communication modules are just transmitters, and
 wherein the at least one vehicle communication module is a transmitter and a receiver or a receiver.

15. The system as claimed in claim 11 wherein one or more of the at least two entrance communication modules, the at least one vehicle communication module, and the load communication module contain a Bluetooth beacon.

16. A controller for a system as claimed in claim 11, the controller comprising connections for the at least two entrance communication modules and the at least one vehicle communication module, the controller further comprising software configured to control the at least two entrance communication modules and the at least one vehicle communication module.

17. A vehicle having the system as claimed in claim 11, wherein the at least two entrance communication modules are arranged on either side of an entrance to a cargo space, and
 wherein the vehicle communication module is arranged in the cargo space, at a distance from the entrance communication modules.

18. The vehicle as claimed in claim 17 wherein the vehicle communication module is arranged on a front wall of the cargo space.

* * * * *